United States Patent [19]
Hershberger

[11] Patent Number: 5,561,714
[45] Date of Patent: Oct. 1, 1996

[54] SCRAMBLING SYSTEM FOR SERIAL DIGITAL VIDEO

[75] Inventor: David L. Hershberger, Nevada City, Calif.

[73] Assignee: Tektronix, Inc., Wilsonville, Oreg.

[21] Appl. No.: 353,610

[22] Filed: Dec. 12, 1994

[51] Int. Cl.$^6$ .............................. H04N 7/167; H04L 9/00; H03M 1/12
[52] U.S. Cl. .................. 380/10; 348/574; 380/42
[58] Field of Search .................. 380/10, 42; 348/572, 348/574

[56] References Cited

U.S. PATENT DOCUMENTS 4,742,543  5/1988  Frederiksen .................. 380/9

OTHER PUBLICATIONS

"Pathological Check Codes for Serial Digital Interface Systems" by Takeo Eguchi, SMPTE Journal, Aug. 1992.

Primary Examiner—Stephen C. Buczinski
Attorney, Agent, or Firm—Francis I. Gray

[57] ABSTRACT

An improved scrambler for serial digital video that is compatible with SMPTE Standard 259M inserts a detector/dithering circuit between the input serial digital signal and a scrambler. The scrambler's statistics are observed by a pair of up/down counters. One counter monitors the scrambled data prior to NRZI encoding to determine transition density, and the other monitors the NRZI encoder output to determine the relative density of "ones" and "zeros" in the scrambled output signal. A pseudorandom generator generates a dither signal which is combined with the least significant bit of selected video words of the input serial digital signal when enabled by the terminal count output from either counter. A complementary descrambler has a similar detector/dithering circuit at its output to restore the original least significant bit of the selected video words. The improved scrambler/descrambler may be implemented in either the serial or the parallel domain. Thus pathological signals are avoided that could create problems within the serial digital video bit stream.

8 Claims, 3 Drawing Sheets

SCRAMBLING SYSTEM FOR SERIAL DIGITAL VIDEO

BACKGROUND OF THE INVENTION

The present invention relates to transmission of serial digital video, and more particularly to a scrambling system for serial digital video which inhibits the generation of pathological serial digital signals by dithering the least significant bit of certain video words only when the pathological serial digital signal would otherwise occur.

The standard for transmission of serial digital video is Society of Motion Picture and Television Engineers (SMPTE) Standard 259M. This standard specifies the use of a nine-bit scrambler followed by a non-return to zero (NRZ) to non-return to zero inverted (NRZI) conversion.

There are two classes of scrambling systems: synchronized and self synchronized. A synchronized scrambling and descrambling system has a pair of pseudorandom sequence generators, one at the transmitter end and the other at the receiver end. These pseudorandom sequence generators need to be periodically initialized or reset so that they are producing the same sequence with respect to the transmitted data.

A self synchronized scrambling and descrambling system does not have a separate pseudorandom sequence generator. Rather the transmitted data itself passes through a linear feedback shift register. Self synchronized scramblers and descramblers have the advantage that they do not need to be initialized or periodically reset. The self synchronized scrambler works by feedback, and the self synchronized descrambler works by feed forward. The shift registers in the scrambler and descrambler contain the same data, although the descrambler's data is time delayed. As soon as the registers in both the transmitter and receiver have filled with data, the scrambling and descrambling system is synchronized and the received data is valid. SMPTE 259M uses a self synchronized scrambler.

Although self synchronized scramblers are attractive in that no synchronization is required, they also have a serious flaw: pathological signals. Pathological signals are described in the paper *Pathological Check Codes for Serial Digital Interface Systems* by Takeo Eguchi, published in the August 1992 issue of The SMPTE Journal, incorporated herein by reference. Certain perfectly legal component video inputs, such as flat color fields, produce some highly un-scrambled looking bit sequences. It is possible to produce long runs of consecutive "ones" or "zeros" with very few transitions. It also is possible to produce extremely long periods with highly lopsided distributions of "ones" and "zeros", resulting in a large low frequency component. The pathological signals described by Eguchi include a repeating sequence of twenty "ones" followed by twenty "zeros", and another consisting of nineteen "zeros" and one "one". These patterns may repeat for the entire active video portion of a video line.

In a synchronized scrambling system it is possible to invent a data sequence which, when convolved with the scrambling sequence, produces long runs of the same symbol and few transitions. In a well designed system such a sequence is extremely unlikely and the likelihood of its occurrence generally may be ignored because the data sequence itself is pseudorandom in nature, but very long and therefore vanishingly unlikely. But with the self synchronized scrambler, the data sequences which produce repetitive patterns with very few transitions are not pseudorandom, but rather represent flat color fields, such as might be produced by graphics generators. Therefore the likelihood that such "pathological" signals might actually be produced in normal system use is significant and cannot be ignored.

As a result a great deal of effort is expended on the design, manufacture and testing of cable equalizers and analog phase lock loops associated with serial digital video. Design, adjustment and operation of these circuits is quite critical because of the possibility of pathological signals. Pathological signals thus are the unfortunate result of the selection of a self synchronized scrambler architecture. The existence of a large amount of equipment makes it impractical to make an incompatible architectural change to the scrambling algorithm defined by SMPTE 259M.

What is desired is a scrambling system for serial digital video that is compatible with the current self synchronized architecture while eliminating the problem presented by pathological signals.

SUMMARY OF THE INVENTION

Accordingly the present invention provides a scrambler for serial digital video that adds dither to the least significant bit of selected video words under certain conditions. The serial digital video scrambler outputs before and after NRZI encoding are input to a pair of up/down counters, one of which is asymmetric, to determine certain statistics about the serial digital video that indicate the presence of a pathological signal. If a pathological signal is detected as indicated by a terminal count output from either up/down counter, then a dithering circuit is enabled. The dithering circuit has a pseudorandom generator that produces a dithering signal. The dithering signal is combined with the least significant bit of selected video words when enabled by the terminal count output from the up/down counters. Thus only when a pathological signal is detected does dithering occur. At the receiving end a complementary digital video descrambler removes the dither to recover the original digital video signal.

The objects, advantages and other novel features of the present invention are apparent from the following detailed description when read in conjunction with the appended claims and attached drawing.

DESCRIPTION OF THE PREFERRED EMBODIMENT

Figure 1:
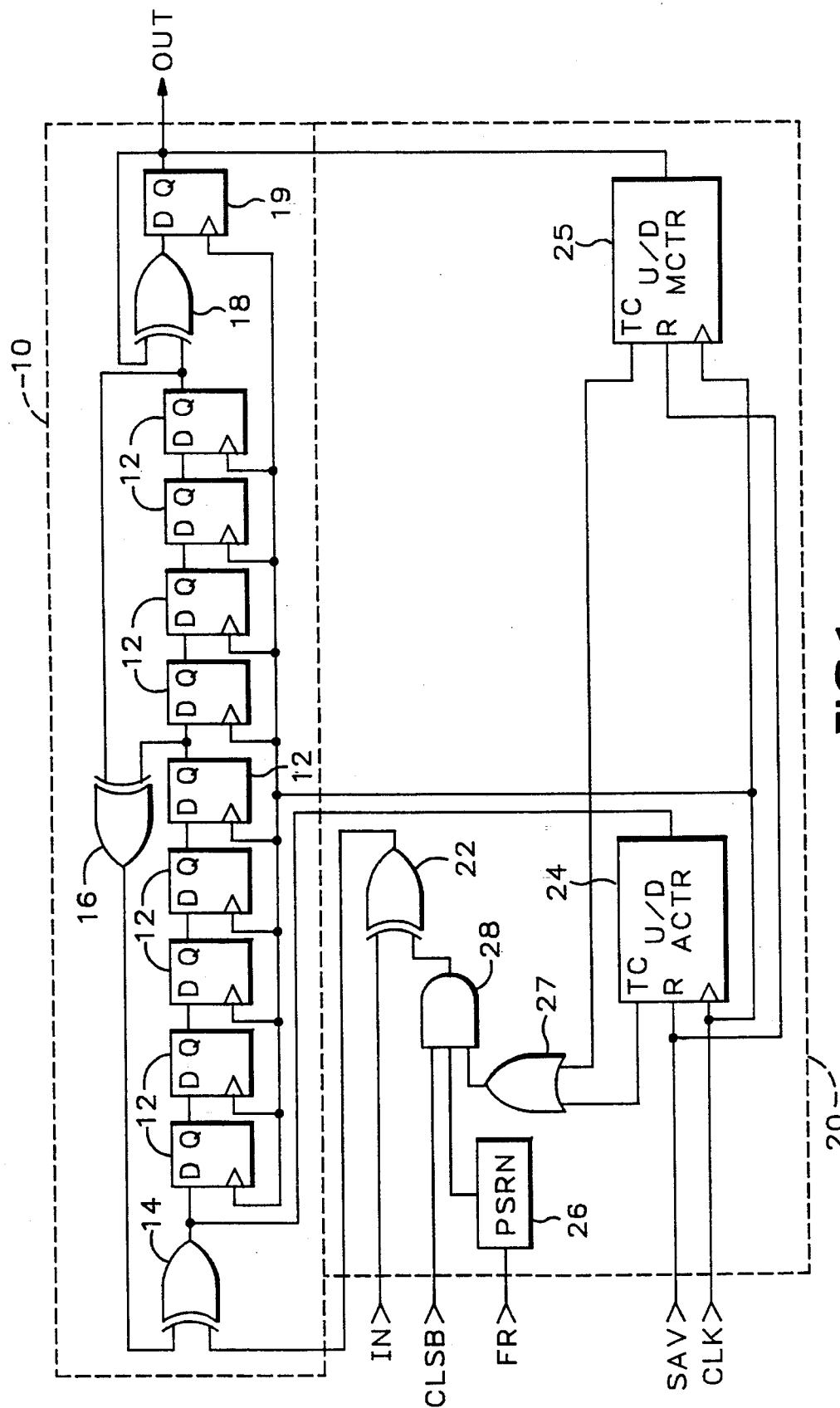
FIG. 1 is a block diagram view of a serial scrambler for serial digital video according to the present invention.

Referring now to FIG. 1 a conventional scrambler 10, as defined by SMPTE 259M, has a series of nine D-type flip-flops 12 coupled in series. An input exclusive OR gate 14 has as one input an input serial digital video signal, and the output is coupled to the input of the nine D-type flip-flops 12. The output from the last of the nine D-type flip-flops 12 is a scrambled signal that is subsequently processed by an NRZ to NRZI converter having an exclusive OR gate 18 and an output register 19 prior to transmission to produce an output scrambled signal. The output from the last D-type flip-flop 12 also is input to a scramble XOR 16, the other input of which is taken from the output of the fifth D-type flip-flop of the series. The output of the scramble XOR 16 is the other input to the input XOR 14. The serial digital video signal from the input XOR gate 14 is clocked through the scrambler 10 by a system clock signal CLK.

At the input to the scrambler 10 is inserted a detector/dither circuit 20. The detector/dither circuit 20 includes an XOR gate 22 to which the input serial digital video signal is applied as one input. The output from the XOR gate 22 is applied as the input to the input XOR gate 14 of the scrambler 10. The scrambled signal output from the input XOR gate 14 also is applied to the input of an asymmetric and saturating up/down counter 24. The asymmetric up/down counter 24 is clocked by the system clock CLK and reset at the beginning of each active video line. For component video the reset signal is the Start of Active Video signal SAV. The terminal count output TC from the asymmetric up/down counter 24 is applied as an enable signal via an OR gate 27 to an AND gate 26. Similarly a modified and saturating up/down counter 25 monitors the output scrambled signal from the NRZ to NRZI converter at the output of the register 19. The modified up/down counter 25 is modified to initialize to one-half of its maximum count by SAV in the case of component video. The modified up/down counter 25 increments when a "one" is transmitted by the output register 19, and decrements when a "zero" is transmitted. Moreover the modified up\down counter 25 periodically decrements by an additional amount when its count is greater than one-half of its maximum count, and it periodically increments by an additional amount when its count is less than one-half of its maximum count. Whenever the modified up/down counter 25 reaches either its minimum or maximum count, it saturates at that count and the TC output is asserted and applied as an input to the OR gate 27. The modified up/down counter 25 thus monitors the relative distribution of "ones" versus "zeros." When this distribution is skewed, the TC output via the OR gate 27 allows either the asymmetric counter 24 or the modified counter 25 to enable dithering via the AND gate 28.

A second enable input to the AND gate 26 is a least significant bit signal CLSB from a selected video word, such as every chrominance data word, i.e., every other data word. When the AND gate 28 is enabled by TC from the OR gate 27 and CLSB, then the output from a pseudorandom noise generator (PSRN) 26 is passed by the AND gate to the other input of the XOR gate 22 where it is combined with the LSB of the selected video word in the input serial digital video signal. The PSRN 26 is periodically initialized at a field or frame rate by a reset signal FR. The reset signals FR and SAV as well as the CLSB signal are derived from the input serial digital video signal.

Most of the time this improved scrambler produces an output identical to the existing SMPTE 259M scrambler 10, since the AND gate 28 is not enabled by the terminal count from either up/down counter 24, 25 so that the input serial digital video signal passes through the XOR gate 22 to the input of the input XOR gate 14 of the scrambler. However when the scrambler 10 fails to produce the desired statistics, approximately 50% average transition density (number of transitions divided by number of bits) and approximately 50% "ones" density, then the improved scrambler begins to dither the LSBs of selected video words on the assumption that the input data is a repetitive value which is adversely affecting the scrambler's output statistics. The LSB dither introduces an element of randomness, and only one bit is enough, which kicks the scrambler out of its repetitive pattern of poor statistics. In the case of component video the video words chosen for LSB dither are chrominance words, i.e., every' other data word, which results in maximum invisibility on a picture monitor. For the sake of convenience the same alternate words in composite systems are dithered. When the resulting signals are recorded on digital video tape, the two LSBs are generally truncated anyway since the great majority of video tape recorders are only 8-bit, while serial digital video is 10-bit.

The problematic "pathological" video signals are transformed from flat field color backgrounds to highly unlikely pseudorandom data patterns whose likelihood, unlike flat color backgrounds, may be safely ignored. Since the LSB chroma dither is invisible on a display screen—small chrominance changes are less visible than luminance changes—and the dithering happens very infrequently, the dithering scrambler is compatible with the SMPTE 259M descrambler.

To determine the requirement for LSB dithering the asymmetric up/down counter 24 counts up by one whenever a "zero" is generated by the scrambler, and decrements by a larger number whenever a "one" is generated. The "one" is later converted to a transition by the NRI to NRZI converter 18, 19. The "zero" converts to no transition. At this point, prior to NRZI conversion, a preponderance of "zeros" is undesirable. When the asymmetric up/down counter 24 reaches either of its terminal counts, all "zeros" or all "ones", it saturates. Thus a preponderance of "zeros" for a period of time causes the asymmetric up/down counter 24 to count up to its maximum value, while desirable statistics—approximately 50% "ones" density—causes the counter to stay at or near its minimum count. When the asymmetric up/down counter 24 reaches its maximum count, the TC signal enables the AND gate 28 via the OR gate 27 for dithering until the counter decrements to a lower value. The length of the asymmetric up/down counter 24 determines how long the scrambler waits before enabling LSB dither. The asymmetry, i.e., decrement value versus increment value, determines what density of "zeros" is tolerated.

Figure 2:
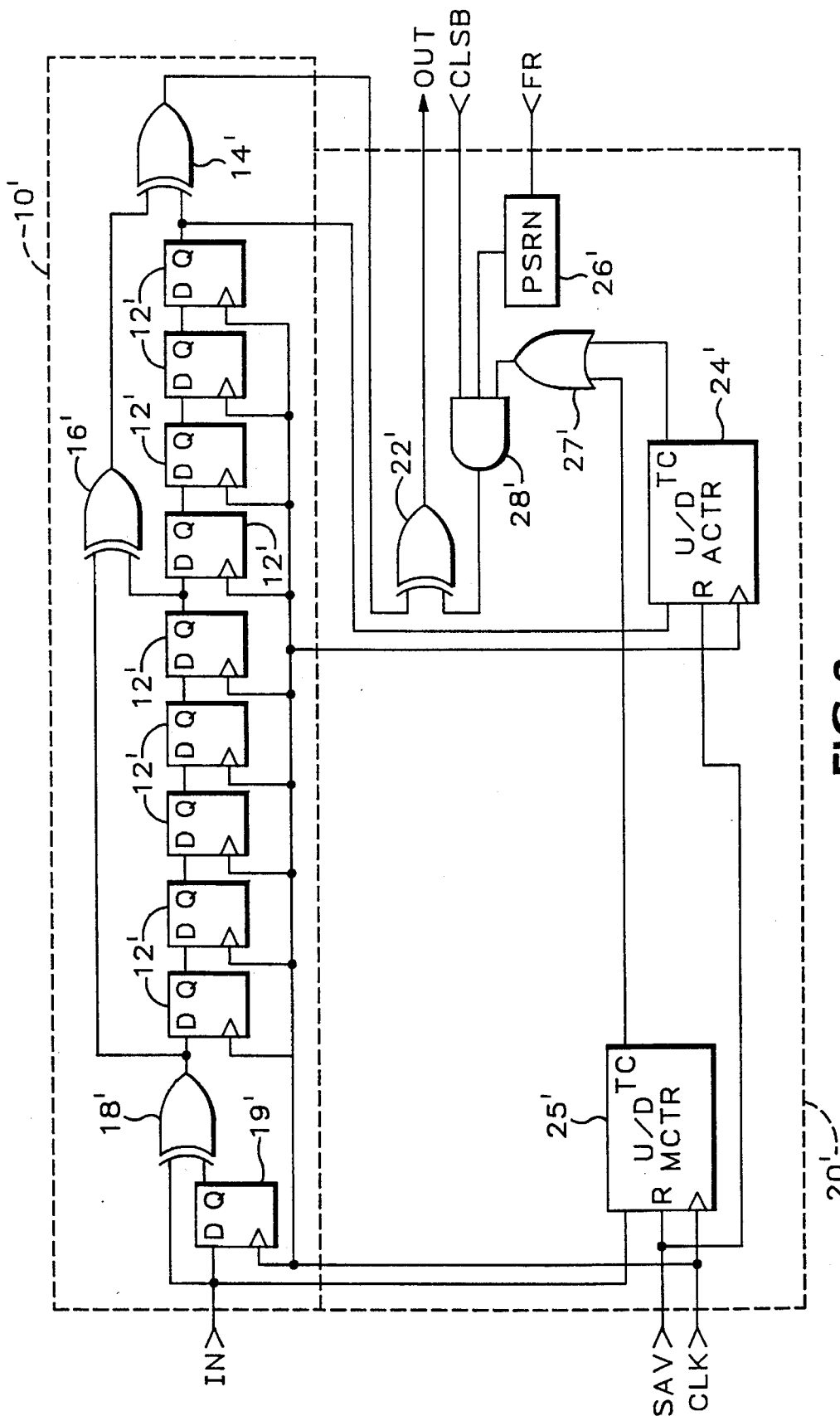
FIG. 2 is a block diagram view of a serial descrambler for serial digital video according to the present invention.

The improved descrambler starts with the existing SMPTE 259M descrambler 10' so that the scrambled data and therefore the statistics of the scrambled data are the same at the receiver as they are at the transmitter. Therefore referring now to FIG. 2 at the descrambler 10' the same up/down counters 24', 25' are used in a detector/dither circuit 20' to infer a decision about whether LSB dither was enabled at the scrambler. The same PSRN 26', AND gate 28' and OR gate 27' also are used. As in the scrambler the timing signals, field/frame reset FR, CLSB gate and SAV, are derived from the serial digital video output signal.

Some means of identifying the scrambling method to the receiving device is recommended. This identification may be made through the transmission of ancillary data. Rather than creating a separate ancillary data packet for scrambling identification, it is more economical to use one or more unassigned words in the Error Data Handling (EDH) packet (SMPTE Recommended Practice RP165). Yet even if the receiver does not know whether LSB dither has been enabled, it still results in no visible change on a picture monitor if LSB dither is applied at the receiver but not at the transmitter.

Figure 3:
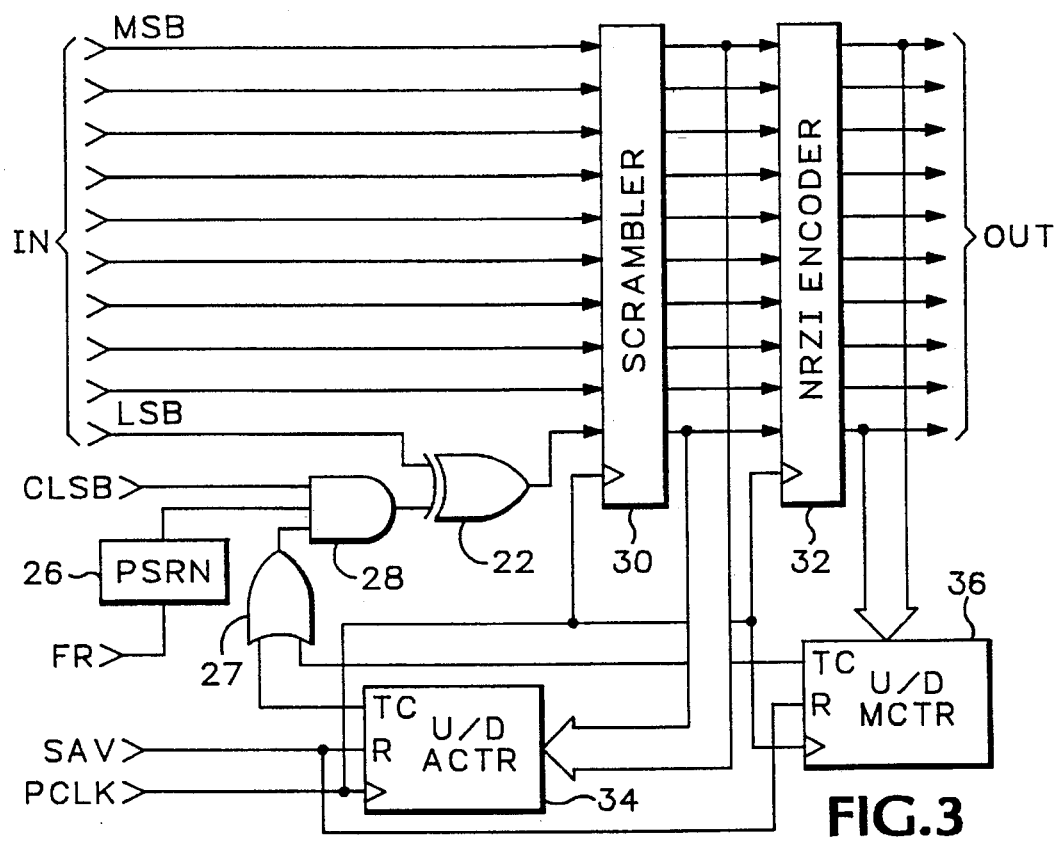
FIG. 3 is a block diagram view of a parallel scrambler for serial digital video according to the present invention.
Figure 4:
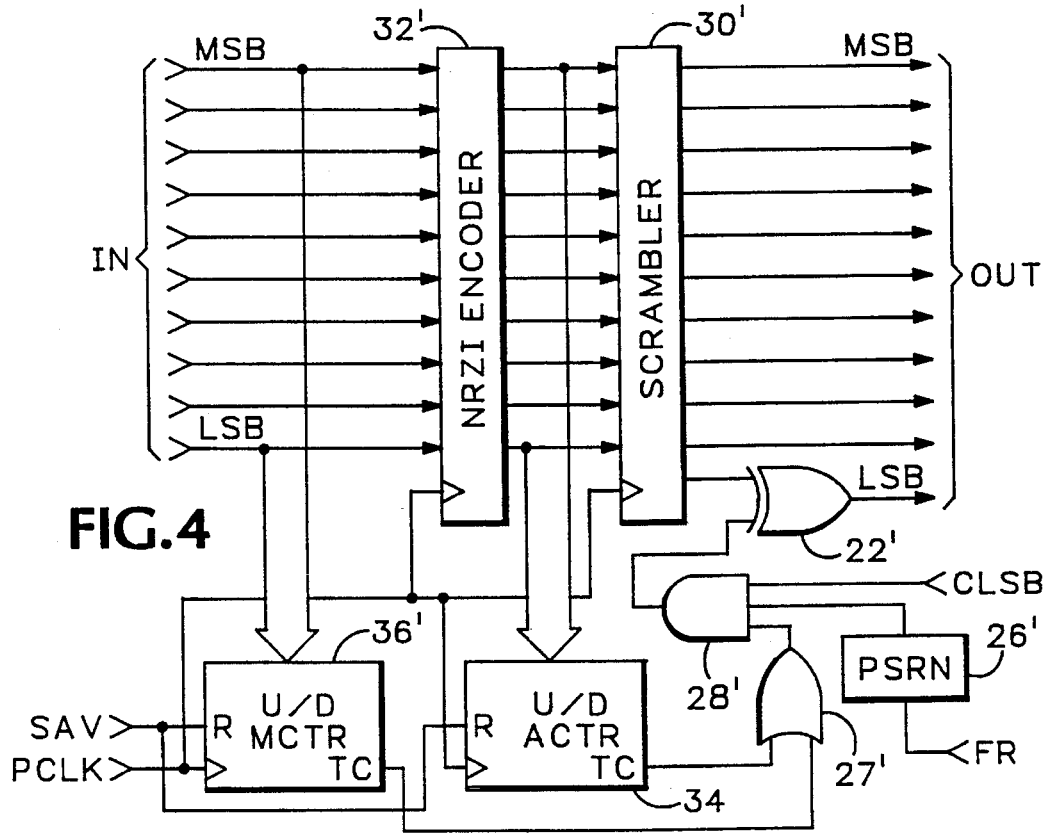
FIG. 4 is a block diagram view of a parallel descrambler for serial digital video according to the present invention.

The invention is described above as a serial domain implementation. However the improved scrambler and descrambler may equally be implemented in the parallel domain, as shown in FIGS. 3 and 4. To change the design from serial to parallel a new state machine is designed for each function which produces a parallel output in a single parallel clock cycle PCLK which is equivalent to the serial output of the serial design after 10 serial clock cycles. The parallel digital words, rather than being converted to serial, are input directly to a scrambler state machine 30, with the LSB being input via the XOR gate 22. The output from the scrambler state machine 30 is the parallel equivalent of the output from the last D-type flip-flop 12 in the serial design. The output from the scrambler state machine 30 is input to a NRZI encoder state machine 32, the output from which is the parallel equivalent of the output from the output register 19 of the serial design, and also to a parallel asymmetric up/down counter 34. The parallel asymmetric up/down counter 34 performs the same function as its counterpart counter 24 in the serial design. Likewise the output from the NRZI encoder state machine 32 is input to a parallel modified up/down counter 36, which functions again like its counterpart counter 25 in the serial design.

Thus the present invention provides a scrambler/descrambler for serial digital video that inhibits the generation of pathological serial digital signals from fiat color fields by dithering the LSB of certain video words only when such pathological condition would otherwise occur by using a pair of up/down counters to determine the statistics of the serial digital video signal.

What is claimed is:

1. An improved scrambler :for serial digital video of the type having a scrambler stage for receiving an input serial digital video signal and providing a scrambled serial digital video signal and an NRZ to NRZI encoder to provide an output scrambled serial digital video signal from the scrambled serial digital video signal, wherein the improvement comprises a detector/dithering circuit for detecting from the scrambled serial digital video signal and the output scrambled serial digital video signal when undesirable statistics exist due to the input serial digital video signal to provide a dither enable signal, and for dithering the least significant bit of selected video words within the input serial digital video signal when the dither enable signal occurs.

2. The improved scrambler as recited in claim I wherein the detector/dithering circuit comprises:

an asymmetric up/down counter coupled to count the "ones" and "zeros" in the scrambled serial digital video signal to produce the dither enable signal when a maximum terminal count is attained representing a transition density lower than a predetermined value; and means for inserting a dither bit into the least significant bit of selected video words of the input serial digital video signal when the dither enable signal is present.

3. The improved scrambler as recited in claim 2 wherein the detector/dithering circuit further comprises a modified up/down counter coupled to count the "ones" and "zeros" in the output scrambled serial digital video signal to produce the dither enable signal when a minimum or maximum terminal count is attained representing an average density of "ones" different from 50% by a predetermined amount.

4. The improved scrambler as recited in claims 2 or 3 wherein the inserting means comprises:

a pseudorandom noise generator for producing a dither signal; and means for gating the dither signal into the least significant bits of the selected video words when enabled by the dither enable signal.

5. The improved scrambler as recited in claim 4 wherein the gating means comprises:

an AND gate having as inputs the dither enable signal, the dither signal and a least significant bit gate signal corresponding to the least significant bits of the selected video words, the AND gate passing the dither signal to an output when enabled by the dither enable signal and the least significant bit gate signal simultaneously; and an XOR gate having as inputs the output from the AND gate and the input serial digital video signal, the XOR gate having an output coupled to the input of the scrambler stage.

6. An improved descrambler for serial digital video of the type having an NRZI to NRZ decoder for receiving a scrambled serial digital video signal and providing a decoded scrambled serial digital video signal and a descrambler stage to provide an output serial digital video signal from the decoded scrambled serial digital video signal, wherein the improvement comprises a detector/dithering circuit for detecting from the scrambled serial digital video signal and the decoded scrambled serial digital video signal when dithering exists in the scrambled serial digital video signal to provide a dither enable signal, and for dithering the least significant bit of selected video words within the output serial digital video signal to remove such dithering when the dither enable signal occurs.

7. A scrambler for digital video comprising:

a scrambler stage for receiving an input digital video signal in parallel form to provide a scrambled digital video signal in parallel form;

an NRZ to NRZI encoder for converting the scrambled digital video signal to an output scrambled digital video signal in parallel form;

means for detecting from the scrambled digital video signal and the output scrambled digital video signal when undesirable statistics exist due to the input digital video signal to provide a dither enable signal; and means for dithering the least significant bit of selected video words within the input digital video signal when the dither enable signal occurs.

8. A descrambler for digital video comprising:

an NRZI to NRZ decoder for converting a scrambled digital video signal in parallel and providing a decoded scrambled digital video signal in parallel form;

a descrambler stage for providing an output digital video signal in parallel form from the decoded scrambled digital video signal;

means for detecting from the scrambled digital video signal and the descrambled digital video signal when dithering occurred in selected words of the scrambled digital video signal to provide a dither enable signal; and means for dithering the least significant bit of the selected words within the output digital video signal in response to the dither enable signal.

\* \* \* \* \*

UNITED STATES PATENT AND TRADEMARK OFFICE
CERTIFICATE OF CORRECTION

PATENT NO : 5,561,714
DATED : October 1, 1996
INVENTOR(S): David L. Hershberger

It is certified that error appears in the above-identified patent and that said Letters Patent is hereby corrected as shown below:

Fig. 4 element 32' should be labeled "decoder" and element 30' should be labeled "descrambler"

Also claim 8, line 9 (column 6, line 54) "descrambled" should be changed to "decoded scrambled"

Signed and Sealed this

Eighth Day of February, 2000

Attest:

Q. TODD DICKINSON

*Attesting Officer*          *Commissioner of Patents and Trademarks*